(12) United States Patent
Yuhara et al.

(10) Patent No.: US 9,780,401 B2
(45) Date of Patent: Oct. 3, 2017

(54) DEVICE FOR PRODUCING PACKAGED ELECTRODE AND METHOD OF PRODUCING PACKAGED ELECTRODE

(75) Inventors: Hiroshi Yuhara, Yokohama (JP); Takahiro Yanagi, Kawasaki (JP); Taewon Kim, Yokohama (JP); Manabu Yamashita, Kyoto (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 241 days.

(21) Appl. No.: 14/007,866

(22) PCT Filed: Apr. 6, 2012

(86) PCT No.: PCT/JP2012/059556
§ 371 (c)(1),
(2), (4) Date: Oct. 7, 2013

(87) PCT Pub. No.: WO2012/137935
PCT Pub. Date: Oct. 11, 2012

(65) Prior Publication Data
US 2014/0013586 A1    Jan. 16, 2014

(30) Foreign Application Priority Data

Apr. 7, 2011  (JP) .................................. 2011-085751

(51) Int. Cl.
*H01M 10/04*   (2006.01)
*H01M 2/18*    (2006.01)
(Continued)

(52) U.S. Cl.
CPC ............. *H01M 10/04* (2013.01); *B29C 65/18* (2013.01); *B29C 65/7841* (2013.01);
(Continued)

(58) Field of Classification Search
CPC .................................................... H01M 10/04
See application file for complete search history.

(56) References Cited

U.S. PATENT DOCUMENTS 2,596,933 A   5/1952   Kirk
3,321,353 A   5/1967   Zelnick
(Continued)

FOREIGN PATENT DOCUMENTS

CN   103250276 A   8/2013
EP   2 458 669 A2  5/2012
(Continued)

OTHER PUBLICATIONS

Fukunaga, translation of JP 2009-9919.*
(Continued)

*Primary Examiner* — Sarah A Slifka
*Assistant Examiner* — Brian Ohara
(74) *Attorney, Agent, or Firm* — Foley & Lardner LLP

(57) ABSTRACT

A device for producing a packaged electrode includes: a conveyance unit configured to sequentially overlay the electrode and the pair of separators from a front end side in a conveying direction while conveying the electrode and the pair of separators; a first joining chip configured to join lateral edges of the pair of separators together; at least one second joining chip positioned downstream of the first joining chip in the conveying direction and configured to join the lateral edges of the pair of separators together. Front ends of the lateral edges of the pair of separators being sequentially overlaid while being conveyed by the conveyance unit are joined together by the first joining chip positioned upstream before the front ends are conveyed to the second joining chip positioned downstream.

7 Claims, 12 Drawing Sheets

(51) Int. Cl.

| | |
|---|---|
| *B29L 31/34* | (2006.01) |
| *B29C 65/18* | (2006.01) |
| *B29C 65/78* | (2006.01) |
| *B29C 65/80* | (2006.01) |
| *B29C 65/48* | (2006.01) |
| *B29C 65/56* | (2006.01) |
| *B29C 65/00* | (2006.01) |
| *B29K 705/00* | (2006.01) |

(52) U.S. Cl.
CPC .......... *B29C 65/7894* (2013.01); *B29C 65/80* (2013.01); *B29C 66/1122* (2013.01); *B29C 66/21* (2013.01); *B29C 66/433* (2013.01); *B29C 66/8161* (2013.01); *B29C 66/81429* (2013.01); *B29C 66/81815* (2013.01); *B29C 66/83543* (2013.01); *B29C 66/9392* (2013.01); *B29C 66/93441* (2013.01); *H01M 2/18* (2013.01); *H01M 10/0404* (2013.01); *H01M 10/0413* (2013.01); *B29C 65/48* (2013.01); *B29C 65/56* (2013.01); *B29C 65/7847* (2013.01); *B29C 65/7852* (2013.01); *B29C 66/91421* (2013.01); *B29K 2705/00* (2013.01); *B29L 2031/3468* (2013.01); *H01M 2220/20* (2013.01); *Y10T 29/49108* (2015.01); *Y10T 29/53135* (2015.01)

(56) References Cited

U.S. PATENT DOCUMENTS

| | | |
|---|---|---|
| 3,729,357 A | 4/1973 | Swartz |
| 3,874,976 A | 4/1975 | MacFraland, Jr. |
| 4,026,000 A | 5/1977 | Anderson |
| 4,300,977 A | 11/1981 | Schulze |
| 4,337,113 A | 6/1982 | Searle |
| 4,769,106 A | 9/1988 | Busching |
| 4,818,340 A | 4/1989 | Hasegawa et al. |
| 5,110,399 A | 5/1992 | Yoshida et al. |
| 5,266,150 A | 11/1993 | Miller |
| 5,284,002 A | 2/1994 | Fowler et al. |
| 6,009,925 A | 1/2000 | Hall et al. |
| 6,086,524 A | 7/2000 | Martin |
| 6,665,999 B1 | 12/2003 | Dierl et al. |
| 6,922,895 B1 | 8/2005 | Whitworth |
| 8,114,536 B2 | 2/2012 | Kang et al. |
| 8,114,537 B2 | 2/2012 | Kang et al. |
| 8,322,594 B2 | 12/2012 | Yano et al. |
| 8,844,795 B2 | 9/2014 | Yano et al. |
| 9,299,965 B2 | 3/2016 | Yuhara et al. |
| 2007/0116999 A1* | 5/2007 | Kuramochi ........... B32B 37/223 429/469 |
| 2007/0264562 A1 | 11/2007 | Kang et al. |
| 2011/0189509 A1 | 8/2011 | Kang et al. |
| 2012/0132697 A1* | 5/2012 | Yano ....................... B29C 65/18 228/212 |
| 2012/0175406 A1 | 7/2012 | Yano et al. |
| 2014/0013585 A1 | 1/2014 | Yuhara et al. |
| 2014/0013597 A1 | 1/2014 | Yuhara et al. |

FOREIGN PATENT DOCUMENTS

| | | | |
|---|---|---|---|
| JP | 52-023632 A | 2/1977 | |
| JP | 53-10029 A | 1/1978 | |
| JP | 59-14261 A | 1/1984 | |
| JP | 62-64056 A | 3/1987 | |
| JP | 3-59948 A | 3/1991 | |
| JP | 5-275073 A | 10/1993 | |
| JP | 07-503930 A | 4/1995 | |
| JP | 3511443 B2 | 3/2004 | |
| JP | 2007-250319 A | 9/2007 | |
| JP | 2007-250319 A | 9/2007 | |
| JP | 2007-329111 A | 12/2007 | |
| JP | 2007-329112 A | 12/2007 | |
| JP | 2009-009919 A | 1/2009 | |
| JP | 2009009919 A * | 1/2009 | ............ H01M 10/36 |
| JP | 2009-123582 A | 6/2009 | |
| JP | 2009-289418 A | 12/2009 | |
| TW | 200805742 A | 1/2008 | |
| WO | WO-2012/070297 A1 | 5/2012 | |

OTHER PUBLICATIONS

European Search Report, Aug. 20, 2014, 5 pages.
Taiwanese Office Action, Jan. 23, 2014, 5 pages.
Supplementary European Search Report dated Jul. 25, 2014, 13 pgs.
USPTO Office Action, U.S. Appl. No. 14/007,865, 9 pages.
Supplementary European Search Report dated Sep. 4, 2014, 5 pgs.
Taiwanese Office Action dated Jan. 23, 2014, 6 pgs.
USPTO Notice of Allowance, U.S. Appl. No. 14/008,749, Aug. 12, 2016, 17 pages.
USPTO Notice of Allowance, U.S. Appl. No. 14/007,865, Aug. 31, 2016, 7 pages.

* cited by examiner

FIG. 1
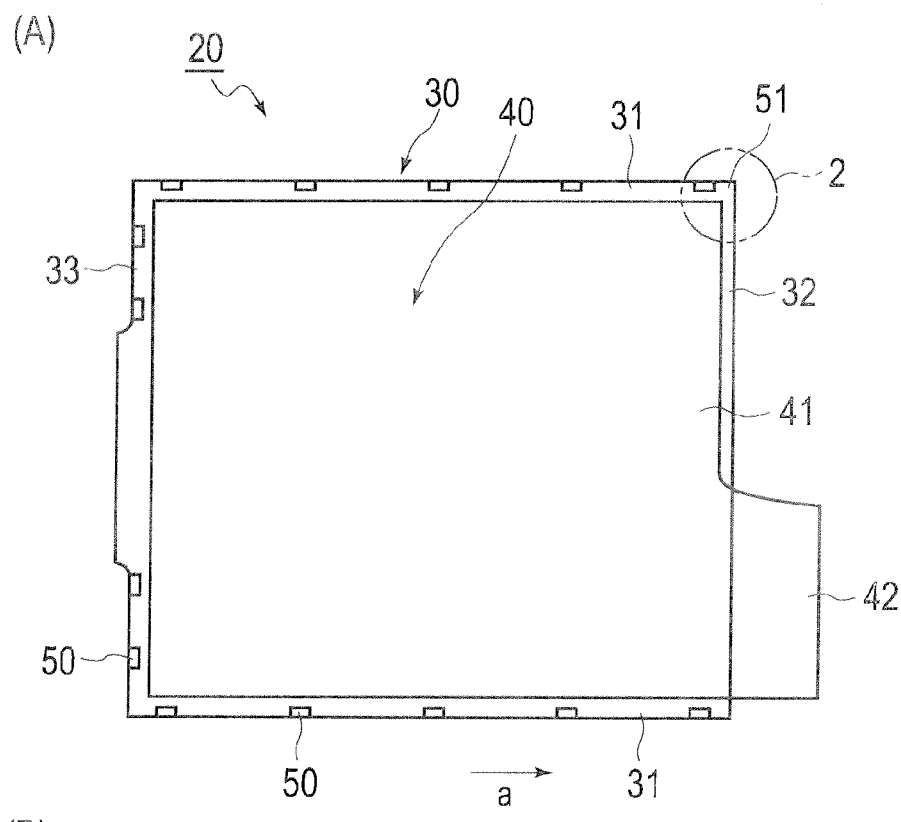
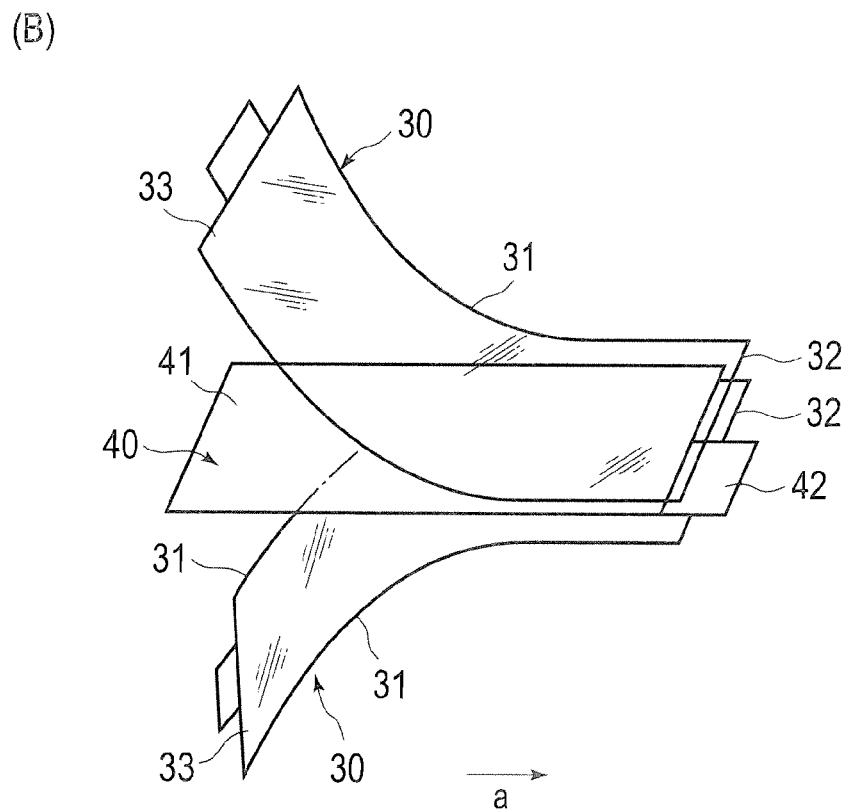

FIG. 2
(A)
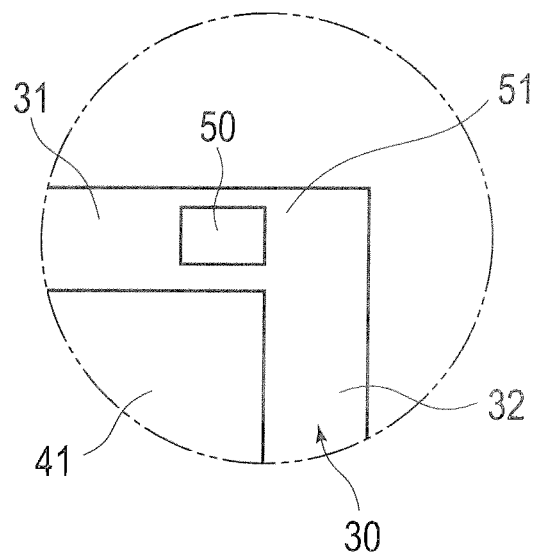
(B)
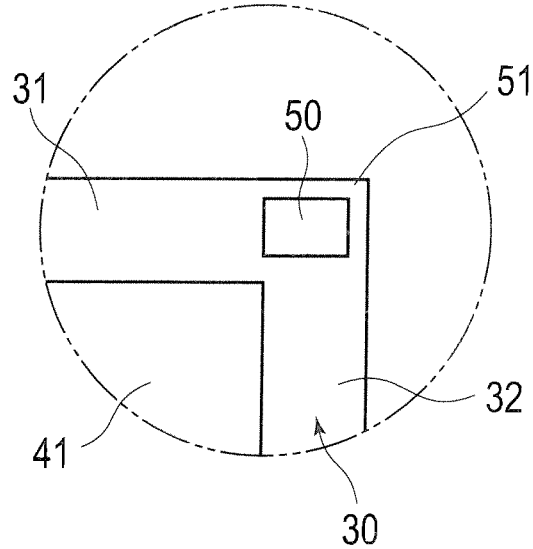

FIG. 9
(A)
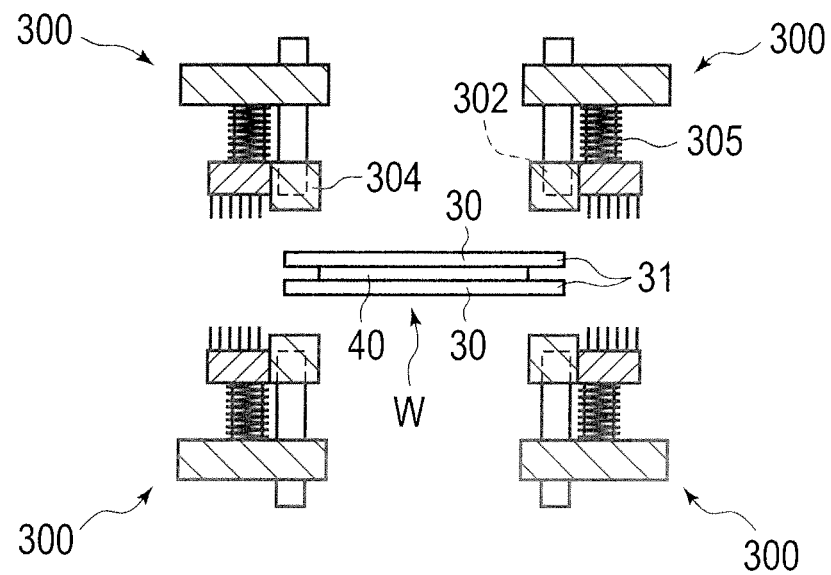
(B)
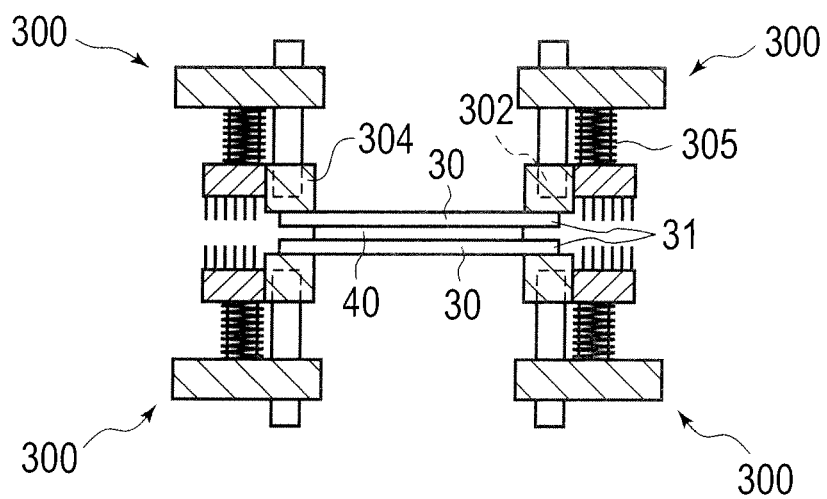

FIG. 10
(A)
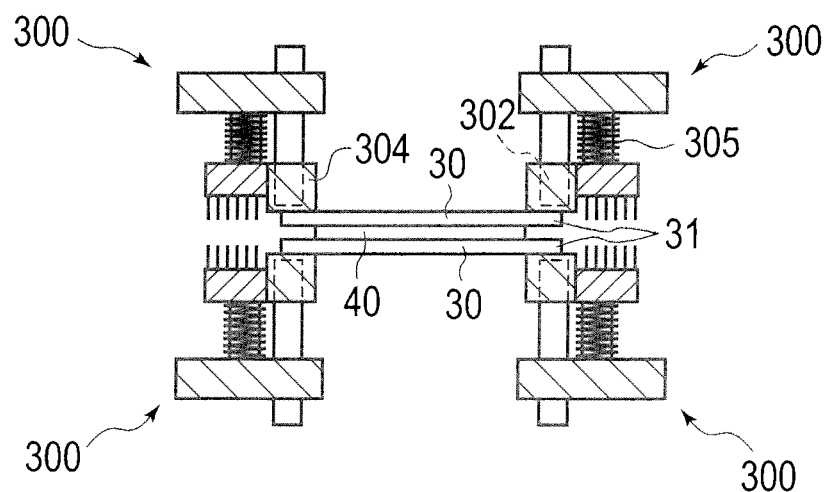
(B)
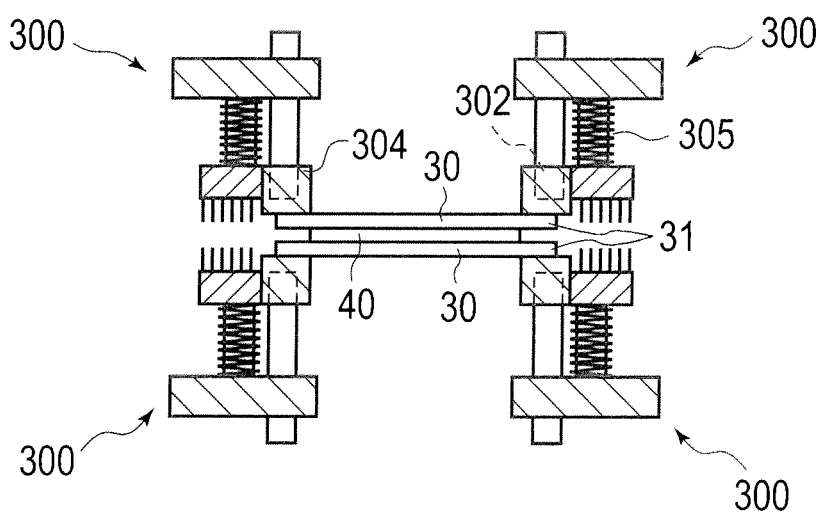

DEVICE FOR PRODUCING PACKAGED ELECTRODE AND METHOD OF PRODUCING PACKAGED ELECTRODE

TECHNICAL FIELD

The present invention relates to a device for producing a packaged electrode and a method of producing a packaged electrode.

BACKGROUND ART

There has been known a packaged electrode produced by packaging electrode between a pair of separators (Patent Literature 1). In this packaged electrode, the separators are joined together at least at four corners.

The separators are thin films, which are easily peeled off. Since batteries for electric vehicles or hybrid vehicles, in particular, are much larger than those for home appliances, handling thereof is difficult and the separators are likely to get wrinkled in addition to peel-off. For this reason, the separators are peeled off or get wrinkled when overlaid on both sides of the electrode. This complicates a joining operation to join the edges of the separators together. Therefore, the efficiency of producing packaged electrodes deteriorates, and in turn, the efficiency of producing an entire battery cannot be increased.

CITATION LIST

Patent Literature

Patent Literature 1: Japanese Patent No. 3511443

SUMMARY OF INVENTION

Technical Problem

Patent Literature 1 includes a discussion of joining positions of a packaged electrode, but no discussion of a technique to increase the efficiency of production.

It is an object of the present invention to provide a device for producing a packaged electrode and a method of producing a packaged electrode, capable of preventing pair of separators from being peeled off or getting wrinkled when overlaying the separators on an electrode, increasing the efficiency of producing packaged electrodes, and thus contributing to increased efficiency in producing an entire battery.

Solution to Problem

In order to achieve the object above, a device for producing a packaged electrode according to the present invention is a device for producing a packaged electrode having an electrode sandwiched between a pair of separators. The device includes: a conveyance unit configured to sequentially overlay the electrode and the pair of separators from a front end side in a conveying direction while conveying the electrode and the pair of separators; a first joining chip configured to join lateral edges of the pair of separators together, the lateral edges extending in the conveying direction; at least one second joining chip positioned downstream of the first joining chip in the conveying direction and configured to join the lateral edges of the pair of separators together; and a controller configured to control operations of the conveyance unit, the first joining chip, and the second joining chip. The controller is configured to drive the first joining chip positioned upstream to join together front ends of the lateral edges of the pair of separators being sequentially overlaid while being conveyed by the conveyance unit, before the front ends are conveyed to the second joining chip positioned downstream.

In order to achieve the object above, a method of producing a packaged electrode according to the present invention is a method of producing a packaged electrode having an electrode sandwiched between a pair of separators. The method includes: sequentially overlaying the electrode and the pair of separators from a front end side in a conveying direction while conveying the electrode and the pair of separators, and joining together front ends of lateral edges of the pair of separators by a joining chip positioned upstream in the conveying direction, which is one of at least two joining chips, before the front ends are conveyed to a joining chip located downstream in the conveying direction.

Advantageous Effects of Invention

According to the present invention, the front ends of the lateral edges of the pair of separators, which sequentially overlaid while being conveyed, are joined together by the first joining chips on the upstream side in the first joining units. Thus, the so-called separation of the pair of separators can be prevented. Moreover, the joining operation to join the lateral edges of the pair of separators together is facilitated without peeling or wrinkles caused in the separators when the separators are overlaid on the electrode. As described above, the pair of separators are prevented from being peeled off or getting wrinkled when the separators are sequentially overlaid on the electrode. Thus, the efficiency of producing the packaged electrode is increased, thus contributing to increased efficiency in producing an entire battery.

BRIEF DESCRIPTION OF DRAWINGS

FIG. 1(A) is a view showing an example of a packaged electrode, and FIG. 1(B) is a perspective view schematically showing how an electrode and a pair of separators are sequentially overlaid from the front end side in a conveying direction while conveying the electrode and the pair of separators.

FIGS. 2(A) and 2(B) are enlarged views of area 2 surrounded by the chain double-dashed line in FIG. 1(A) for explaining the position of "front end" at which the pair of separators are joined.

FIG. 9(A) is a view showing a state before a joining head approaches a workpiece, and FIG. 9(B) is a view showing a state where the joining head approaches the workpiece and the holding unit comes into contact with the workpiece.

FIG. 10(A) is a view showing a state where the holding unit is moved from a forward position to a backward position while in contact with the workpiece and a tip of a joining chip comes into contact with the workpiece, and FIG. 10(B) is a view showing a state where the joining head is separated from the workpiece from the state shown in FIG. 10(A) and thus the tip of the joining chip is separated from the workpiece while the holding unit keeps holding the workpiece.

DESCRIPTION OF EMBODIMENTS

Figure 3:
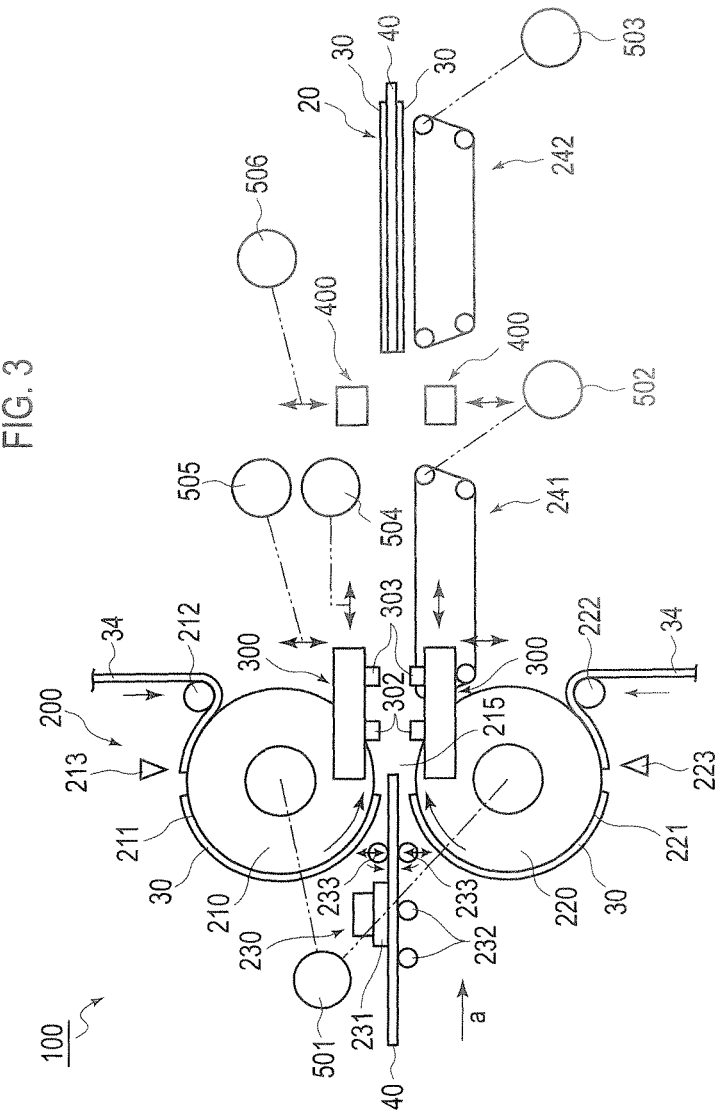
FIG. 3 is a configuration diagram showing a main part of a device for producing a packaged electrode.

With reference to the accompanying drawings, embodiments of the present invention will be described below. Note that, in the description of the drawings, the same parts will be denoted by the same reference numerals and redundant description will be omitted. In addition, dimensional ratios of the drawings are exaggerated for convenience of description, and may differ from the actual ratios.

Note that arrow a shown in FIGS. 1(A) and 1(B) and FIG. 3 denotes a conveying direction in which an electrode 40 and a pair of separators 30 are conveyed during production of a packaged electrode 20. In FIGS. 1(A) and 1(B) and FIG. 3, the right-hand side is the downstream side of the conveying direction, which will be referred to as "front" of each member, and the left-hand side is the upstream side of the conveying direction, which will be referred to as "rear" of each member. Also, edges of the separators extending in the conveying direction will be referred to as "lateral edges", while edges of the separators extending in a direction intersecting the conveying direction will be referred to as "front edge" and "rear edge". In addition, a laminate having the electrode 40 sandwiched between the pair of separators 30, more specifically, a laminate before completion of joining of the separators 30 will be referred to as "workpiece W".

As shown in FIGS. 1(A) and 1(B), the packaged electrode 20 is obtained by packing the positive or negative electrode 40 into a package using the pair of separators 30. In this embodiment, the positive electrode is used to produce the packaged electrode 20. The electrode 40 includes a main body part 41 having an active material applied to both sides of a metal foil, and a tab 42 formed of a part of the metal foil and electrically connected to other members. Each of the separators 30 is a thin film made of a resin material and has a size slightly larger than that of the main body part 41 of the electrode 40. Only the main body part 41 of the electrode 40 is sandwiched by the pair of separators 30, and the tab 42 of the electrode 40 is exposed to the outside. In addition, lateral edges 31 of the laminated pair of separators 30 are joined together. Moreover, at least one of front edges 32 and rear edges 33 of the laminated pair of separators 30 are joined together. In the example shown in FIG. 1(A), the rear edges 33 of the laminated pair of separators 30 are joined together.

The number of junction points 50 on the lateral edges 31 is five, for example, while junction points 50 on the rear edges 33 is four, for example.

With reference to FIGS. 2(A) and 2(B), description will be given of a position of a "front end 51" at which the separators 30 are joined together in this embodiment. The "front end 51" at which the separators 30 are joined together can be freely set from the viewpoint of suppressing so-called separation of the laminated separators 30. For example, a position (FIG. 2(A)) aligned with the main body part 41 of the electrode 40, literally a corner (FIG. 2(B)) of the separator 30, and a position aligned with an application line of the active material may be set as the front end.

With reference to FIG. 3, a device 100 for producing the packaged electrode 20 generally includes: a conveyance unit 200 configured to sequentially overlaying the electrode 40 and the pair of separators 30 from the front end 51 side in the conveying direction while conveying the electrode 40 and the pair of separators 30; first joining units 300 configured to join the lateral edges 31 of the pair of separators 30 together; and second joining units 400 configured to join at least one of the front edges 32 and the rear edges 33 of the pair of separators 30 together. The lateral edges 31 of the pair of separators 30 sequentially overlaid while being conveyed by the conveyance unit 200 are sequentially joined together by the first joining units 300 from the front end 51 side in the conveying direction. Meanwhile, in a state where the conveying by the conveyance unit 200 is stopped, at least one of the front edges 32 and the rear edges 33 of the pair of separators 30 are joined together by the second joining units 400. In the example shown in FIG. 3, the rear edges 33 of the pair of separators 30 are joined together by the second joining units 400. The above process will be described in detail below.

The conveyance unit 200 includes: stacking drums 210 and 220 which are a pair of cylindrical rotors holding the pair of separators 30, respectively; an electrode installation unit 230 disposed on the upstream side of the pair of stacking drums 210 and 220; and downstream conveyance parts 241 and 242 disposed on the downstream side of the pair of stacking drums 210 and 220. In addition, a nip part 215 configured to nip the workpiece W is formed between the pair of stacking drums 210 and 220. The size of clearance of the nip part 215 is appropriately adjusted according to the thickness of the workpiece W. The electrode installation unit 230 feeds the electrode 40 formed into a predetermined shape toward the nip part 215 along the tangential direction. The multiple downstream conveyance parts 241 and 242 are provided to convey the overlaid electrode 40 and pair of separators 30. In the example shown in FIG. 3, the two downstream conveyance parts 241 and 242 are provided, and the second joining units 400 is disposed between the downstream conveyance parts 241 and 242.

The electrode installation unit 230 includes, for example: an attraction device 231 configured to attract and convey the electrode 40; a supporting roller 232 configured to support the electrode 40 conveyed by the attraction device 231; and a pair of installation rollers 233 configured to feed the electrode 40 toward the nip part 215 along the tangential direction. The attraction device 231 is vertically lowered to attract the electrode 40, lifted while maintaining an approximately horizontal state of the electrode, and then moved toward the downstream side in the conveying direction. The installation rollers 233 are each provided so as to be freely approachable to and separable from the electrode 40 conveyed by the attraction device 231, and are rotated while sandwiching the electrode 40 therebetween to feed the electrode 40 toward the nip part 215 along the tangential direction. Note that there is a case where the position of the electrode 40 to be attracted by the attraction device 231 is shifted in the conveying direction or shifted obliquely to the conveying direction. In the electrode installation unit 230, a positional shift of the electrode 40 to be attracted and conveyed is detected by a sensor camera before attraction of the electrode 40 by the attraction device 231. After the attraction of the electrode 40, the attraction device 231 moves while correcting the posture of the electrode 40 to an appropriate posture. Thus, the electrode 40 is conveyed in the appropriate posture toward the nip part 215.

The pair of stacking drums 210 and 220 are arranged one above the other, and have a cylindrical shape. The pair of stacking drums 210 and 220 are arranged such that rotation axes thereof are parallel to each other with a predetermined space therebetween in a direction orthogonal to the conveying direction. The stacking drums 210 and 220 have circumferential surfaces which serve as holding surfaces 211 and 221 to hold the separators 30, respectively. The stacking drums 210 and 220 convey the separators 30 formed into a predetermined shape while holding the separators on their circumferential surfaces. The width of the holding surfaces 211 and 221 of the stacking drums 210 and 220 in the rotation axis direction is smaller than that of the separators 30. The conveyance unit 200 conveys the pair of separators 30 in a state where the lateral edges 31 stick out of the holding surfaces 211 and 221, respectively.

Although means for holding the separators 30 on the holding surfaces 211 and 221 of the stacking drums 210 and 220 is not particularly limited, means using vacuum attraction, electrostatic attraction or the like is applicable. In the case of vacuum attraction, for example, the holding surfaces 211 and 221 have multiple air vacuum holes. By sucking in air from these air vacuum holes, the separators 30 are held on the holding surfaces 211 and 221.

The pair of stacking drums 210 and 220 are rotated in the same direction toward the from side in the conveying direction in the nip part 215. More specifically, the upper stacking drum 210 is rotated counterclockwise in FIG. 3 to convey the separator 30 attached to the holding surface 211 toward the nip part 215. On the other hand, the lower stacking drum 220 is rotated clockwise to convey the separator 30 attached to the holding surface 221 toward the nip part 215. The pair of stacking drums 210 and 220 are rotationally driven in synchronization with each other by a stacking drum drive motor 501 connected to the rotation axes of the drums. A controller 500 performs rotation control of the stacking drum drive motor 501.

The electrode installation unit 230 feeds the electrode 40 toward the nip part 215 along the tangential direction while conveying the electrode in an approximately horizontal state in synchronization with the rotation of the stacking drums 210 and 220. Meanwhile, the pair of stacking drums 210 and 220 feed toward the nip part 215 the separators 30 attached to the holding surfaces 211 and 221 in accordance with the rotation. Thus, the conveyance unit 200 can laminate the electrode 40 and the pair of separators 30 while conveying and sequentially overlaying the electrode 40 and the pair of separators 30 from the front end 51 side in the conveying direction.

The separators 30 are formed by cutting out a continuous separator member 34 reeled out from an unillustrated separator roll. For the pair of stacking drums 210 and 220, timing rollers 212 and 222 are provided, respectively, which sandwich the separator member 34 with the stacking drums 210 and 220. The controller 500 controls the operation of the timing rollers 212 and 222, and also controls when to feed the separator member 34 onto the stacking drums 210 and 220. An upper separator cutter 213 is provided above the upper stacking drum 210, while a lower separator cutter 223 is provided below the lower stacking drum 220. When the separator member 34 is fed onto the stacking drums 210 and 220 by the timing rollers 212 and 222, the separator member 34 is attached to the holding surfaces 211 and 221 of the stacking drums 210 and 220 and conveyed. Then, when the separator member 34 is conveyed to a predetermined position, the separator cutters 213 and 223 are activated. Thus, the separators 30 having a predetermined shape are cut out of the separator member 34.

The two downstream conveyance parts 241 and 242 include, for example: a first conveyor 241 configured to mount thereon and convey the workpiece W fed from the nip part 215 between the stacking drums 210 and 220; and a second conveyor 242 arranged on the downstream side of the first conveyor 241 and configured to mount thereon and convey the workpiece W for which joining of the lateral edges 31 of the separators 30 is finished. The second joining units 400 are arranged between the first and second conveyors 241 and 242. After the rear edges 33 of the pair of separators 30 are joined together by the second joining units 400, the second conveyor 242 conveys the produced packaged electrode 20 toward a stage for next processing. The first and second conveyors 241 and 242 can be formed using attraction conveyors, for example. The first and second conveyors 241 and 242 each have a width smaller than that of the separators 30 so that the conveyors do not interfere with reciprocating movement of the first joining units 300 to be described later (see FIG. 6(A)). The first and second conveyors 241 and 242 are rotationally driven by conveyor drive motors 502 and 503 connected to rollers, in synchronization with the conveyance of the workpiece W. The controller 500 performs rotation control of the conveyor drive motors 502 and 503. Note that while the conveyors are used as the downstream conveyance parts 241 and 242, other conveyance devices such as an attraction hand may be used.

The first joining units 300 are arranged in a pair one above the other while facing each other across a conveyance path to convey the overlaid electrode 40 and pair of separators 30, i.e., a conveyance path of the workpiece W (see FIGS. 5(B) and 5(C)). The second joining units 400 are also arranged in a pair one above the other while facing each other across the conveyance path of the workpiece W (see FIG. 6(B)). Since joining is performed from both sides of the pair of separators 30, a uniform joint state can be realized as compared with the case of joining only from one side. Moreover, adjustment for optimization of joining conditions is facilitated when material properties of the separators 30 are different, more particularly when separators 30 with different thermal properties are used.

In the first and second joining units 300 and 400, means for joining the edges of the overlaid pair of separators 30 is not particularly limited, but means using thermal welding, pressure bonding, adhesive bonding or welding can be adopted. In this embodiment, the joining is performed by thermal welding. This is because thermal welding enables the separators 30 made of resin to be easily joined together.

Figure 5:
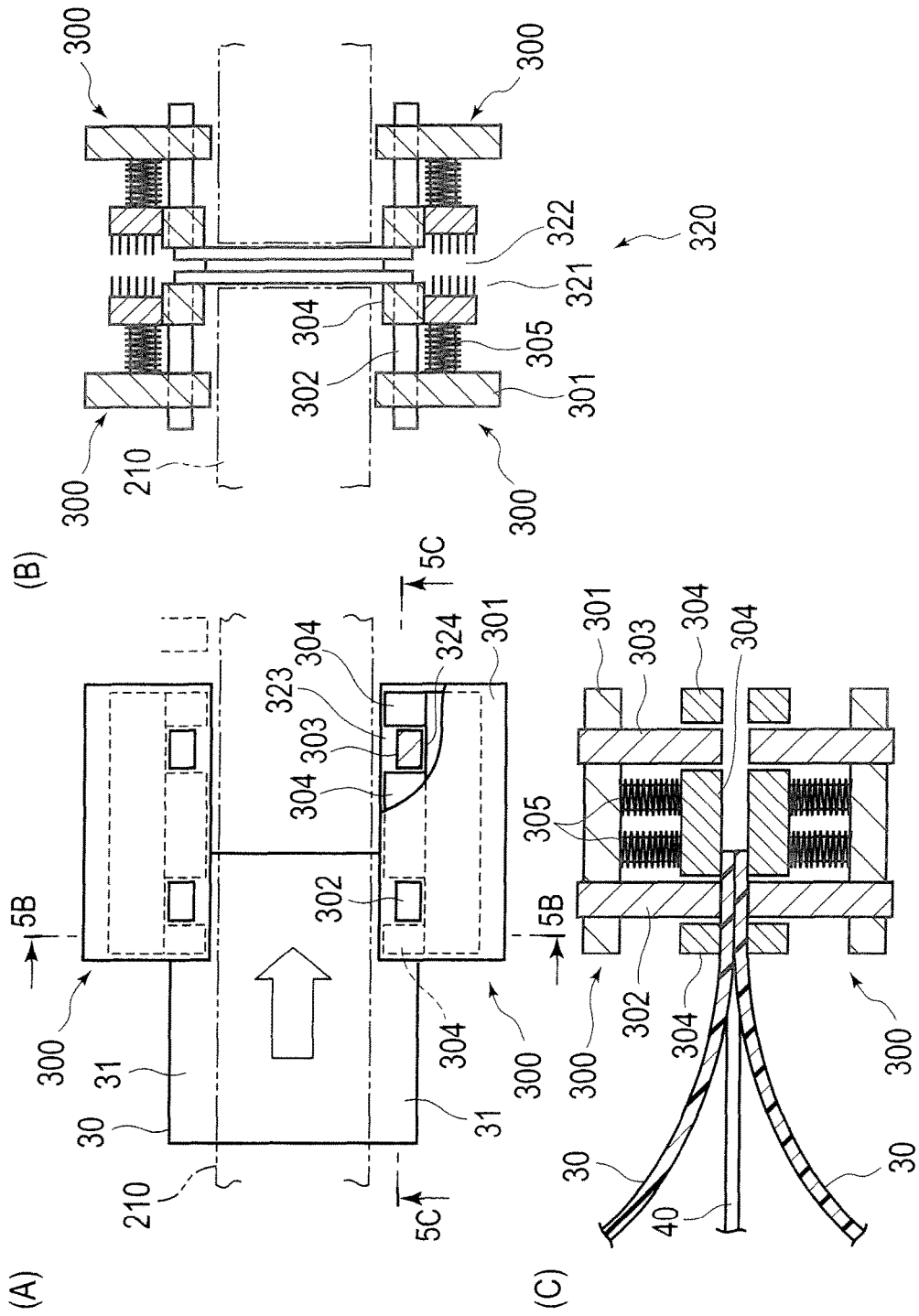
FIG. 5(A) is a plan view showing a first joining unit.
FIG. 5(B) is a cross-sectional view taken along the line 5B-5B in FIG. 5(A)
FIG. 5(C) is a cross-sectional view taken along the line 5C-5C in FIG. 5(A), showing a state in a first joining operation to join lateral edges of the separators at the front end.
Figure 7:
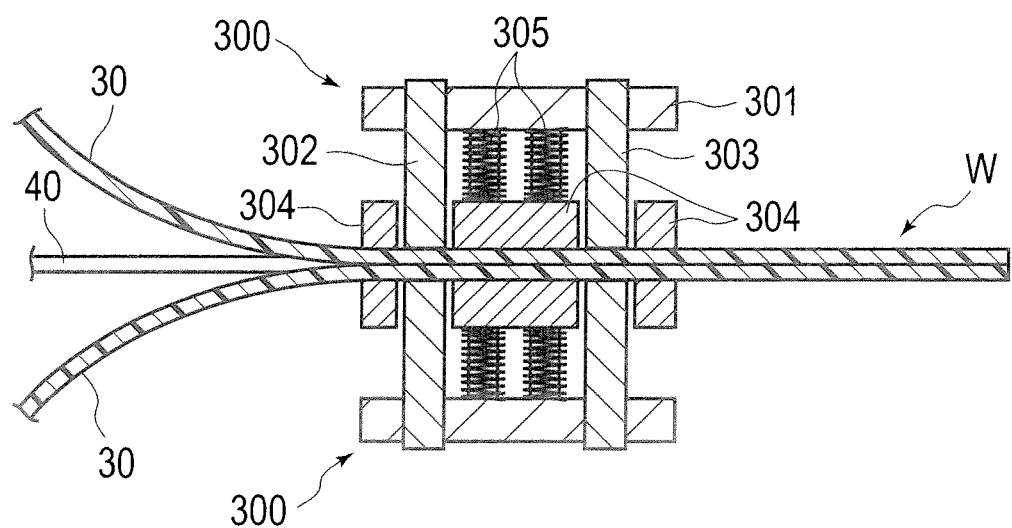
FIG. 7 is a view showing a state in second and subsequent joining operations to join the lateral edges of the separators by the first joining unit.

As shown in FIGS. 5 and 7, each of the first joining units 300 has a joining head 301 which is freely approachable to and separable from the workpiece W. In addition, joining chips 302 and 303 to join the separators 30 together and a holding unit 304 to hold the workpiece W are attached to the joining head 301. The holding unit 304 is attached to the joining head 301 so as to be freely movable between a forward position (FIG. 9(A)) beyond the tips of the joining chips 302 and 303 and a backward position (FIG. 10(A)) retreated from the forward position. Between the joining head 301 and the holding unit 304, a clamp spring 305 is provided as a biasing member to apply a biasing force to the holding unit 304, the biasing force moving the holding unit 304 toward the forward position.

In the first joining units 300 thus configured, when the joining head 301 relatively approaches the workpiece W, the holding unit 304 comes into contact with the workpiece W and moves backward from the forward position to the backward position. Accordingly, the tips of the joining chips 302 and 303 come into contact with the workpiece W for joining (see FIGS. 9(A) and 9(B) and FIG. 10(A)).

On the other hand, when the joining head 301 is relatively separated from the workpiece W from the state where the tips of the joining chips 302 and 303 are in contact with the workpiece W, the tips of the joining chips 302 and 303 are separated from the workpiece W in a state where the holding unit 304 keeps holding the workpiece W (FIGS. 10(A) and 10(B)). Then, the holding unit 304 is moved forward from the backward position to the forward position by the biasing force of the clamp spring 305 and separated from the workpiece W.

The first joining units 300 are reciprocated between a rear position (a position indicated by reference numeral P1 in FIG. 11(A)) on the rear side in the conveying direction of the workpiece W and a front position (a position indicated by reference numeral P2 in FIG. 11(C)) on the front side in the conveying direction of the workpiece W. In addition, the first joining units 300 are moved up and down between a holding position (a position indicated by reference numeral P3 in FIG. 12(B)) where the workpiece W is held by the holding unit 304 and a release position (a position indicated by reference numeral P4 in FIG. 12(A)) where the holding of the workpiece W by the holding unit 304 is released.

The first joining units 300 are reciprocated between the rear position P1 and the front position P2 by a reciprocating drive mechanism 504 including ball screws, a motor and the like. Also, the first joining units 300 are driven up and down between the holding position and the release position by a first up-and-down drive mechanism 505 including ball screws, a motor and the like. The controller 500 controls operations of the reciprocating drive mechanism 504 and the first up-and-down drive mechanism 505. In addition, the joining chips 302 and 303 generate heat with electric power supplied from a first power supply unit 507 (see FIG. 4). The controller 500 controls the first power supply unit and adjusts the temperature of the joining chips 302 and 303 by controlling the amount of power supplied to the joining chips 302 and 303, power distribution time and the like.

Each of the first joining units 300 includes: a first joining chip 302 configured to join the lateral edges 31 of the pair of separators 30; and at least one (one in the illustrated example) second joining chip 303 positioned on the downstream side of the first joining chip 302 in the conveying direction and configured to join the lateral edges 31 of the pair of separators 30. The lateral edges 31 of the separators 30 are joined together by the two joining chips 302 and 303. On the joined separators 30, multiple junction points 50 (five points in the illustrated example) are formed along the lateral edges 31 as shown in FIG. 1(A).

In the first round of joining, the front ends 51 of the lateral edges 31 of the pair of separators 30 sequentially laminated while being conveyed by the conveyance unit 200 are joined by the first joining chips 302 on the upstream side before conveyed to the second joining chips 303 on the downstream side (see FIG. 5(C)). In this event, the second joining chips 303 on the downstream side are striking air. After the joining of the front ends 51 in the first joining, the lateral edges 31 of the pair of separators 30 conveyed by the conveyance unit 200 are joined together by both of the first and second joining chips 302 and 303 in second and third rounds of joining (see FIG. 7). The above joining operation is repeated three times in total to form the five junction points 50.

The holding unit 304 functions as a clamp member moved together with the joining units while holding the pair of separators 30. The pair of separators 30 can be conveyed by holding the pair of separators 30 with the holding unit 304 functioning as the clamp member and moving the joining units.

Figure 8:
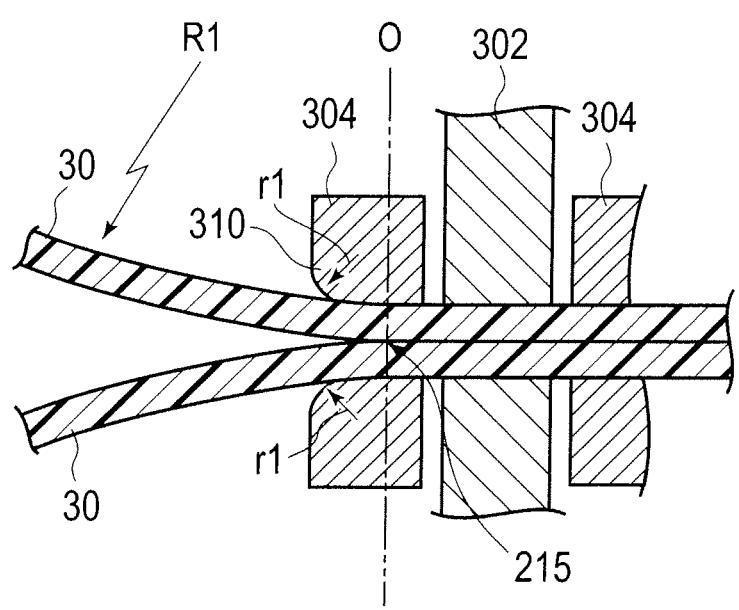
FIG. 8 is an enlarged cross-sectional view showing the shape of a holding unit of the first joining unit.

It is preferable that the holding unit 304 has a tapered portion 310 which is wider toward the upstream side of the separator 30 in the conveying direction (see FIG. 8). This is because the tapered portion can prevent conveyance failure due to collision between the holding unit 304 and the conveyed electrode 40 or tips of the separators 30. A curvature radius r1 of the tapered portion 310 of the holding unit 304 is set smaller than a curvature radius R1 of the circumferential surfaces of the stacking drums 210 and 220. In addition, a curvature of the tapered portion 310 is set larger than that of the circumferential surfaces of the stacking drums 210 and 220.

Note that reference numeral O in FIG. 8 denotes a straight line connecting the centers of the pair of stacking drums 210 and 220. It is preferable that the nip part 215 is set on the line.

It is preferable that the holding unit 304 has heat dissipation means 320. This is to prevent the active material in the electrode 40 and the like from being adversely affected by heat accumulated in the holding unit 304 during the joining operations.

The heat dissipation means 320 (FIG. 5(C)) can be formed using a material having a good thermal conductivity as a material to form the holding unit 304, for example, or can be formed of a heat dissipation fin 321 connected to the holding unit 304 as shown in the drawing. The heat dissipation efficiency of the holding unit 304 can be improved only by forming the holding unit 304 using a material having a good thermal conductivity such as aluminum, for example. The use of the heat dissipation fin 321 as the heat dissipation means 320 can further improve the heat dissipation efficiency of the holding unit 304.

It is preferable that the holding unit 304 has a space for heat dissipation 322 formed around the heat dissipation means 320. This is because the movement of the first joining units 300 generates an airflow, which diffuses heat dissipated from the heat dissipation means 320, and thus the heat dissipation efficiency of the holding unit 304 can be improved.

It is preferable that the holding unit 304 is formed of a wall member 324 including openings 323 provided so as to surround the first and second joining chips 302 and 303, respectively, and to expose the joining chips 302 and 303 to the outside (see FIG. 5(A)). This is because U-shaped disposition of the wall member 324 can secure the heat dissipation efficiency of the holding unit 304 by allowing the heat to easily escape while maintaining the original functions of the holding unit 304 such as holding the separators 30.

Figure 6:
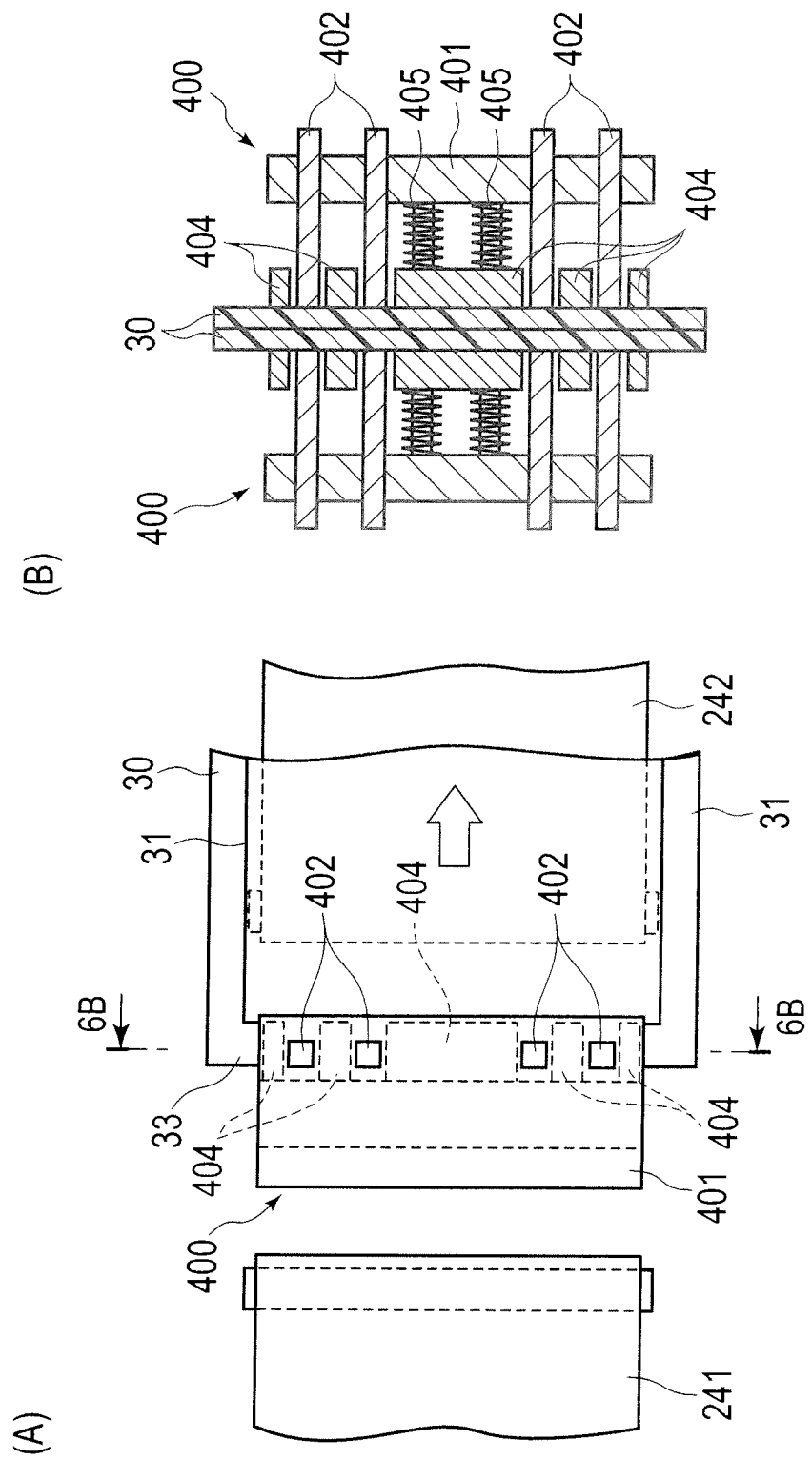
FIG. 6(A) is a plan view showing a second joining unit.
FIG. 6(B) is a cross-sectional view taken along the line 6B-6B in FIG. 6(A).

As shown in FIG. 6, each of the second joining units 400 includes a joining head 401, a joining chip 402, a holding unit 404 and a clamp spring 405 as a biasing member, as in the case of the first joining units 300. Also in the second joining units 400, when the joining head 401 relatively approaches the workpiece W, the holding unit 404 comes into contact with the workpiece W and moves backward from the forward position to the backward position. Accordingly, the tip of the joining chip 402 comes into contact with the workpiece W. On the other hand, when the joining head 401 is relatively separated from the workpiece W from the state where the tip of the joining chip 402 is in contact with the workpiece W, the tip of the joining chip 402 is separated from the workpiece W in a state where the holding unit 404 keeps holding the workpiece W. Then, the holding unit 404 is moved forward from the backward position to the forward position and separated from the workpiece W by the biasing force of the biasing member 405.

The second joining units 400 are not reciprocated in the conveying direction of the workpiece W and only moved up and down between a holding position where the workpiece W is held by the holding unit 404 and a release position where the holding of the workpiece W by the holding unit 404 is released.

The second joining units 400 are driven up and down between the holding position and the release position by a second up-and-down drive mechanism 506 including ball screws, a motor and the like. The controller 500 controls operations of the second up-and-down drive mechanism 506. In addition, the joining chip 402 generates heat with electric power supplied from a second power supply unit 508 (see FIG. 4). The controller 500 controls the second power supply unit and adjusts the temperature of the joining chip 402 by controlling the amount of power supplied to the joining chip 402, power distribution time and the like.

Each of the second joining units 400 includes multiple (four in the illustrated example) joining chips 402. The rear edges 33 of the separators 30 are joined together by the four joining chips 402. On the joined separators 30, multiple junction points 50 (four points in the illustrated example) are formed along the rear edges 33 as shown in FIG. 1(A).

Figure 4:
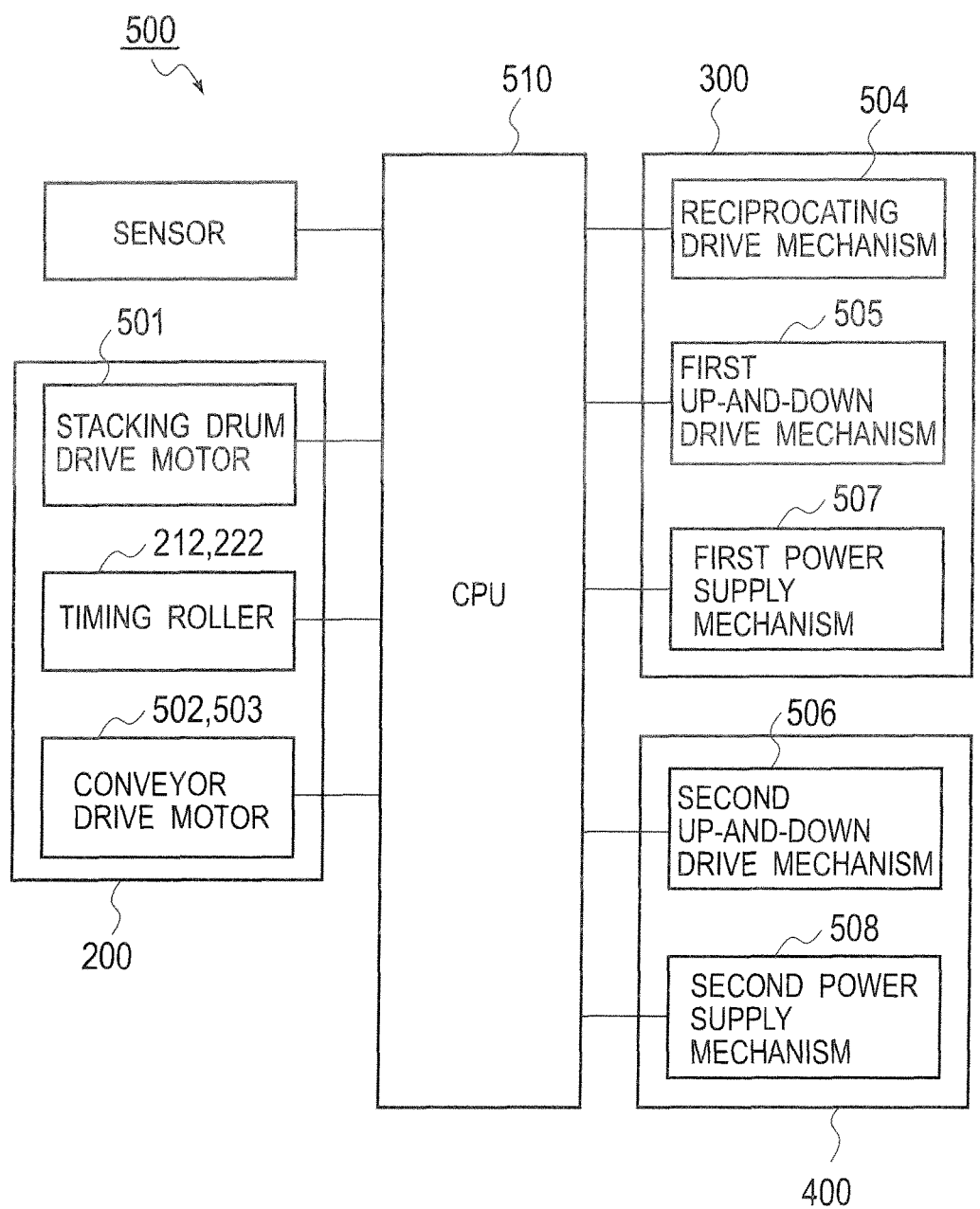
FIG. 4 is a block diagram showing a control system of the device for producing a packaged electrode.

As shown in FIG. 4, the device 100 for producing the packaged electrode 20 has the controller 500 to control the respective units and parts. The controller 500 mainly includes a CPU 510, a memory storing control programs and the like, an operation panel, and the like. Signals from various sensors detecting conveyance positions, postures and the like of the separators 30 and the electrode 40 are inputted to the CPU 510. The CPU 510 outputs signals to the stacking drum drive motor 501, the timing rollers 212 and 222 and the conveyor drive motors 502 and 503 in the conveyance unit 200 to control operations thereof. Moreover, the CPU 510 outputs signals to the reciprocating drive mechanism 504, the first up-and-down drive mechanism 505, and the first power supply unit 507 in the first joining unit 300 to control operations thereof. Furthermore, the CPU 510 outputs signals to the second up-and-down drive mechanism 506 and the second power supply unit 508 in the second joining unit 400 to control operations thereof.

Figure 11:
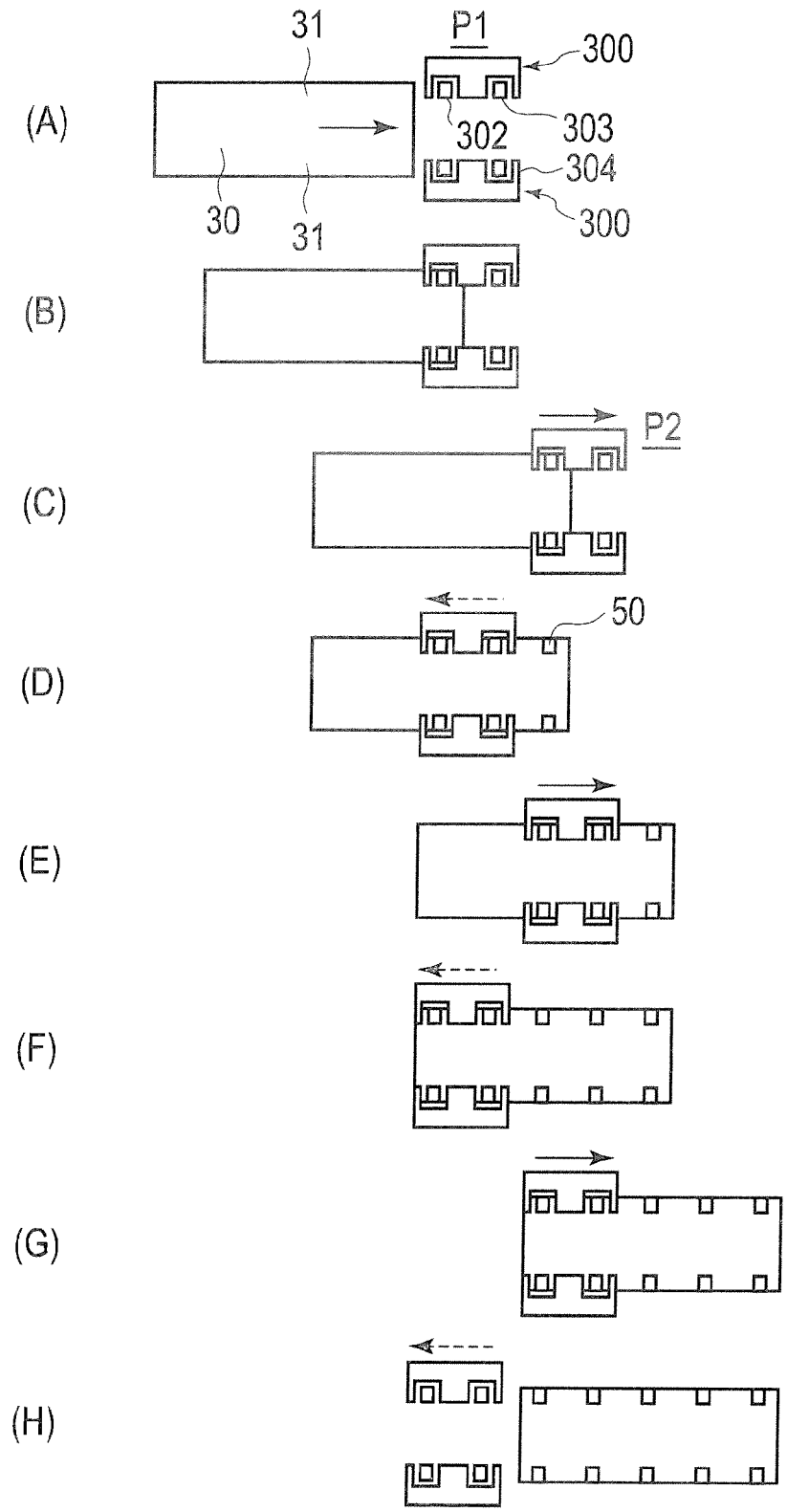
FIGS. 11(A) to 11(H) are schematic views showing reciprocating operations of the holding unit in the first joining unit.
Figure 12:
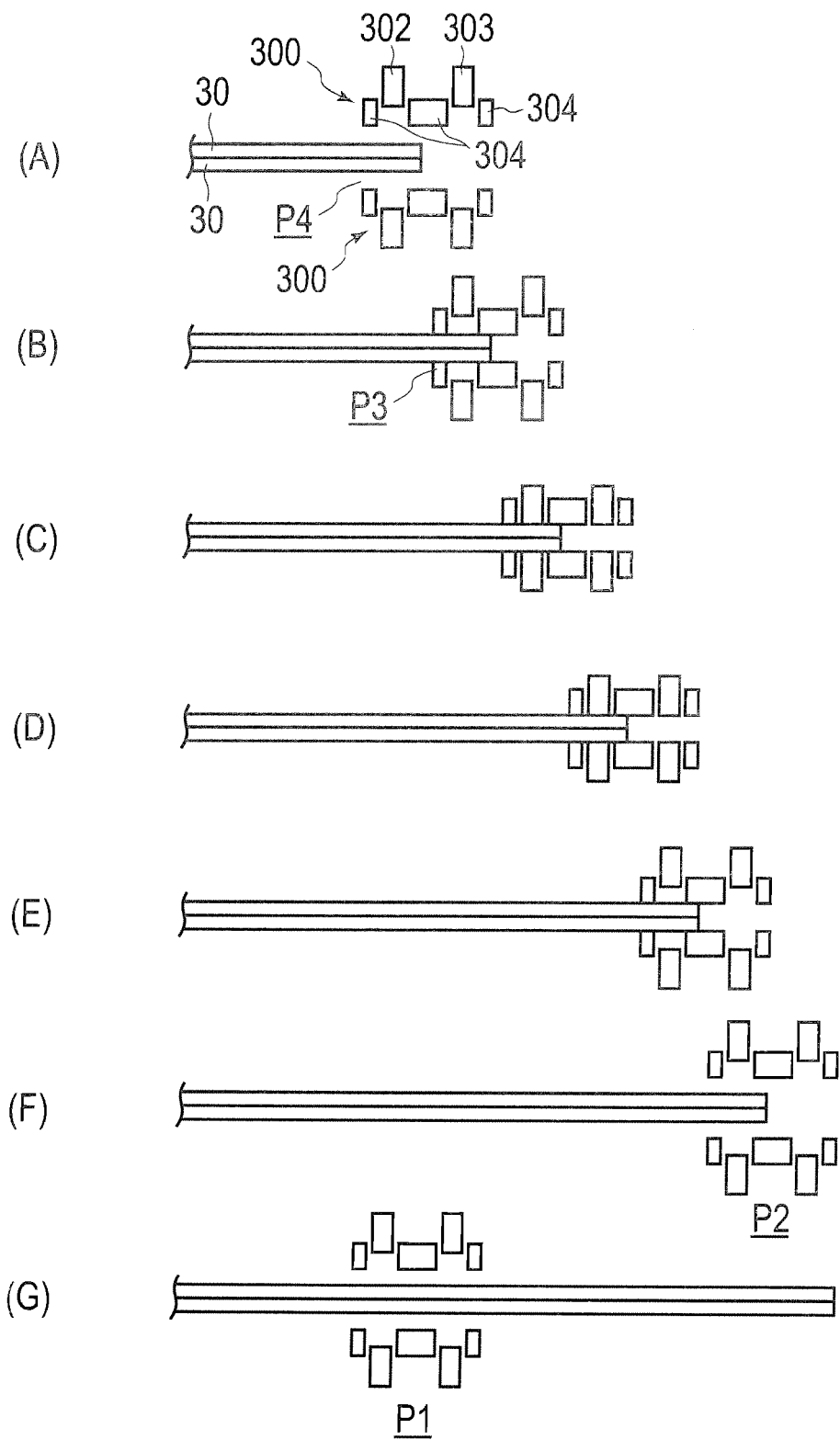
FIGS. 12(A) to 12(G) are schematic views showing a first joining operation by the first joining unit.

With reference to FIGS. 11 and 12, operations of the device 100 for producing the packaged electrode 20 will be described.

FIGS. 11(A) to 11(H) schematically show the reciprocating operation of the holding units 304 in the first joining units 300. FIGS. 12(A) to 12(G) schematically show a first joining operation by the first joining units 300.

The first joining units 300 are reciprocated between the rear position P1 and the front position P2 (FIGS. 11(A) to 11(C)) and moved up and down between the holding position P3 and the release position P4 (FIGS. 12(A) and 12(B)).

In FIG. 11, the solid arrows indicate forward movement of the first joining units 300, and the dashed arrows indicate backward movement of the first joining units 300. The first joining units 300 moves forward in synchronization with the movement of the separators 30 by the conveyance unit 200. To facilitate understanding, FIGS. 11(B) to 11(H) show as if the first joining units 300 hold and convey the separators 30. On the other hand, FIG. 12 shows a state where the first joining units 300 move forward in synchronization with the conveyance of the separators 30.

First, as shown in FIG. 3, the electrode 40 and the pair of separators 30 are sequentially overlaid from the front end 51 side in the conveying direction while being conveyed by the conveyance unit 200. In this event, the electrode 40 is conveyed forward in an approximately horizontal state by the electrode installation unit 230 in the conveyance unit 200 in synchronization with the rotation of the stacking drums 210 and 220, and then fed toward the nip part 215 between the stacking drums 210 and 220 along the tangential direction. Moreover, the separators 30 each cut out into a predetermined shape are attached to the holding surfaces 211 and 221 of the stacking drums 210 and 220 in the conveyance unit 200 by the stacking drums 210 and 220, and conveyed toward the nip part 215 along with the rotation of the drums.

The upper and lower first joining units 300 are normally located at the release position P4 with an opening therebetween (FIG. 12(A)). Once the separators 30 are conveyed, the first joining units 300 are closed to hold tip portions of the lateral edges 31 of the separators 30 (FIG. 11(B)). Before the separators 30 reach the second joining chips 303 on the downstream side after passing the first joining chips 302 on the upstream side, the first joining units 300 reach the holding position P3 to hold the separators 30 with the holding units 304 (FIG. 12(B)).

The first joining units 300 are moved forward to the front position P2 in synchronization with the rotation of the stacking drums 210 and 220 while holding the separators (FIG. 11(C)). The first joining units 300 join the lateral edges 31 of the pair of separators 30 together using the first joining chips 302 on the upstream side while moving from the rear position P1 to the front position P2 (FIGS. 12(C) and 12(D)). In this event, the second joining chips 303 on the downstream side strike air (FIGS. 12(C) and 12(D)).

After the first round of joining, the upper and lower first joining units 300 are opened and returned to the release position P4 to release the holding of the separators 30 (FIGS. 12(E) and 12(F)). Then, the first joining units 300 are moved backward to the rear position P1 (FIGS. 11(D) and 12(G)).

Thereafter, the first joining units 300 are closed again and moved to the holding position P3 to hold the lateral edges 31 of the separators 30, and then moved forward to the front position P2 in synchronization with the rotation of the stacking drums 210 and 220 (FIG. 11(E)). The first joining units 300 join the lateral edges 31 of the pair of separators 30 together using both of the first and second joining chips 302 and 303 while moving from the rear position P1 to the front position P2.

After the second round of joining, the upper and lower first joining units 300 are opened and returned to the release position P4 to release the holding of the separators 30. Then, the first joining units 300 are moved backward to the rear position P1 (FIG. 11(F)).

Thereafter, the first joining units 300 are closed again and moved to the holding position P3 to hold the lateral edges 31 of the separators 30, and then moved forward to the front position P2 in synchronization with the rotation of the stacking drums 210 and 220 (FIG. 11(G)). The first joining units 300 join the lateral edges 31 of the pair of separators 30 together using both of the first and second joining chips 302 and 303 while moving from the rear position P1 to the front position P2.

After the third round of joining, the upper and lower first joining units 300 are opened and returned to the release position P4 to release the holding of the separators 30. Then, the first joining units 300 are moved backward to the rear position P1 (FIG. 11(H)). Thus, the first joining units 300 repeat a total of three joining operations to form five junction points 50. By the first joining units 300 joining the lateral edges 31 of the separators 30 multiple times from the front end 51 side in the conveying direction, the lateral edges 31 of the separators 30 can be joined together over a wide range.

The workpiece W sent from the nip part 215 between the stacking drums 210 and 220 is placed on the first conveyor 241 and conveyed. Upon completion of the joining operation by the first joining units 300, the front of the workpiece W is placed on the second conveyor 242. Then, the workpiece W is conveyed by the second conveyor 242. Once the rear edges 33 of the pair of separators 30 reach the position of the joining chips 402 of the second joining units 400, the conveyance of the workpiece W by the second conveyor 242 is stopped.

In the state where the conveyance of the pair of separators 30 is stopped, the second joining units 400 are closed and moved to the holding position to hold the rear edges 33 of the separators 30. While the conveyance of the pair of separators 30 remains stopped, the rear edges 33 of the pair of separators 30 are joined together by the four joining chips 402. The second joining units 400 performs the joining operation only once to form four junction points 50 in the illustrated example at the same time.

Upon completion of the joining of the rear edges 33, the upper and lower second joining units 400 are opened and returned to the release position P4 to release the holding of the separators 30. Thus, the joining of the separators 30 to the workpiece W is finished to produce the packaged electrode 20 in which the lateral edges 31 and rear edges of the pair of separators 30 are joined together, respectively. Subsequently, the second conveyor 242 is driven again to convey the produced packaged electrode 20 toward a stage for next processing.

Thereafter, in an unillustrated subsequent step, the positive packaged electrode 20, the negative electrode 40 and the positive packaged electrode 20 are alternately laminated to produce a battery cell.

Figure 13:
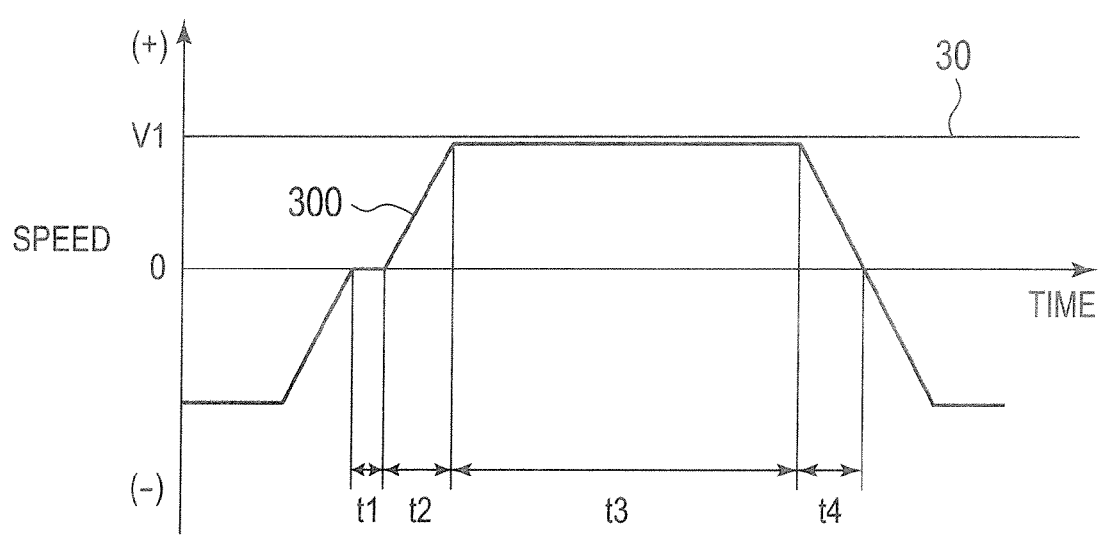
FIG. 13 is a schematic diagram showing a conveyance speed of the workpiece conveyed by a cylindrical rotor and a variation in speed of the first joining unit reciprocating many times.

FIG. 13 schematically shows the conveyance speed of the workpiece W conveyed by the stacking drums 210 and 220 and a variation in speed of the first joining units 300 reciprocated multiple times. In the diagram, the speed takes positive values during forward movement in the conveying direction.

The workpiece W passing the nip part 215 is conveyed at speed V1 by the rotation of the stacking drums 210 and 220. On the other hand, the first joining units 300 are reciprocated between the rear position P1 and the front position P2 by the reciprocating drive mechanism 504. In the diagram, time t1 indicates the time during which the first joining units 300 stands by at the rear position P1 for the timing of the conveyance of the workpiece W, and time t2 indicates the time during which the first joining units 300 are accelerating after starting its forward movement. In addition, time t3 indicates the time during which the first joining units 300 are moved such that a speed of the first joining units 300 relative to the conveyance speed of the workpiece W approaches zero, and time t4 indicates the time during which the first joining units 300 are slowing down to move backward.

The first joining units 300 join the lateral edges 31 of the laminated separators 30 together during their movement with the workpiece W. Moreover, the first joining units 300 repeat the joining while moving multiple times (three times in this embodiment) from the front end 51 side in the conveying direction. The workpiece W gets wrinkled or poor junction occurs unless the workpiece W and the first joining units 300 are moved at approximately the same speed.

Therefore, in this embodiment, the joining performed while moving the first joining units 300 configured to join the lateral edges 31 of the pair of separators 30 together, such that the speed of the first joining units 300 relative to the conveyance speed of the workpiece W approaches zero is repeated multiple times from the front end 51 side in the conveying direction. More specifically, welding is sequentially performed multiple times from the front end 51 side while conveying the separators 30. Thus, the processing time can be reduced while preventing separation of the separators 30. Also, successful joining can be performed without wrinkles generated in the workpiece W.

In addition, it is preferable that the joining is performed when the movement speed of the first joining units 300 becomes constant. This is because it is difficult to match acceleration rates of the separators 30 and the first joining units 300, and timing adjustment for joining and the like are facilitated compared with the case where the joining is performed while accelerating both of the separators 30 and the joining units 300.

Moreover, the lateral edges 31 of the pair of separators 30, which are sequentially overlaid while being conveyed, are sequentially joined together by the first joining units 300. Thus, so-called separation of the pair of separators 30 can be prevented, and the joining operation to join the lateral edges 31 of the pair of separators 30 together is facilitated without peeling or wrinkles caused in the separators 30 when the separators 30 are overlaid on the electrode 40.

Furthermore, it is preferable that the pair of separators 30 are moved together with the first joining units 300 while being held by the holding units 304 as the clamp members. Thus, the joining can be performed with the positions of the separators 30 fixed by the holding units 304. As a result, accurate joining can be performed.

In this embodiment, the conveyance unit 200, the first joining units 300 and the second joining units 400 have the configurations described above, and the controller 500 controls the operations of the conveyance unit 200, the first joining units 300 and the second joining units 400. Thus, the following various operations are realized.

Specifically, the electrode 40 and the pair of separators 30 are sequentially overlaid from the front end 51 side in the conveying direction while being conveyed. Also, the front ends 51 of the lateral edges 31 of the pair of separators 30 are joined together by the first joining chips 302 on the upstream side of the conveying direction, of the two joining chips 302 and 303, before conveyed to the second joining chips 303 on the downstream side.

With this configuration, the front ends 51 of the lateral edges 31 of the pair of separators 30, which are sequentially overlaid while being conveyed, are joined together by the first joining chips 302 on the upstream side in the first joining units 300. Thus, the so-called separation of the pair of separators 30 can be prevented. Moreover, the joining operation to join the lateral edges 31 of the pair of separators 30 together is facilitated without peeling or wrinkles caused in the separators 30 when the separators 30 are overlaid on the electrode 40. As described above, the pair separators 30 are prevented from being peeled off or getting wrinkled when the separators 30 are sequentially overlaid on the electrode 40. Thus, the efficiency of producing the packaged electrode 20 is increased, thus contributing to increased efficiency in producing an entire battery.

After the joining of the front ends 51 is completed, the lateral edges 31 of the pair of separators 30 conveyed are joined together by the multiple joining chips 302 and 303. Since the lateral edges 31 of the pair of separators 30 are joined together by the multiple joining chips 302 and 303, the time required for joining can be reduced. Thus, the production can be speeded up.

In the joining of the front ends 51, only the first joining chips 302 on the upstream side may be operated for the joining. Thus, the second joining chips 303 on the downstream side need not be operated for the joining of the front ends 51. As a result, air striking by the second joining chips 303 on the downstream side can be avoided.

The joining of the front ends 51 is performed immediately after overlaying of the pair of separators 30 is started. Accordingly, the front ends 51 are joined together immediately after the start of overlaying of the lateral edges 31 of the separators 30. Thus, so-called separation of the pair of separators 30 can be further prevented.

Besides the above, this embodiment has the following features.

Specifically, the electrode 40 is packed by sequentially joining the lateral edges 31 of the pair of separators 30 together from the front end 51 side in the conveying direction while sequentially overlaying the electrode 40 and the pair of separators 30 from the front end 51 side in the conveying direction while conveying the electrode 40 and the pair of separators 30. Next, the rear edges 33 of the pair of separators 30 are joined together in a state where the conveyance of the pair of separators 30 is stopped.

Thus, the lateral edges 31 of the pair of separators 30, which are sequentially overlaid while being conveyed, are sequentially joined together by the first joining units 300 from the front end 51 side in the conveying direction. Thus, so-called separation of the pair of separators 30 can be prevented. Therefore, the joining operation to join the lateral edges 31 of the pair of separators 30 together is facilitated without peeling or wrinkles caused in the separators 30 when the separators 30 are overlaid on the electrode 40. Moreover, the joining of the rear edges 33 of the pair of separators 30 by the second joining units 400 realizes a state where the separators 30 are joined together not only on two sides facing each other in a plan view but also on the other sides. Consequently, the pair of separators 30 is not peeled off or does not get wrinkled even after the separators 30 are overlaid on the electrode 40, thus saving troublesome work such as correcting peel-off or wrinkles. As described above, the pair of separators 30 are prevented from being peeled off or getting wrinkled when the separators 30 are sequentially overlaid on the electrode 40 and also in subsequent processing. Thus, the efficiency of producing the packaged electrode 20 is increased, thus contributing to increased efficiency in producing an entire battery.

In the meantime, in the case of mass production of products through a number of steps such as various processing steps, assembly steps and inspection steps, a conveyance tact is specifies and the same processing time is set for each step. Then, a workpiece processed in each of the steps is moved to the next step. It is also an important challenge for the mass production technique to reduce the number of steps by performing multiple processes within the limits of the specified conveyance tact and thus to increase the production efficiency.

The joining of the rear edges 33 of the pair of separators 30 can also be performed in a separate step. However, in this case, the number of steps is increased, leading to a possibility that a total production time is increased. Therefore, the demand for increased efficiency in production cannot be met. Moreover, since the packaged electrode 20 has the configuration in which the electrode 40 is sandwiched between the pair of separators 30, the electrode 40 and the pair of separators 30 need to be conveyed in synchronization with each other. Therefore, conveyance and stopping of conveyance are repeated for the right timing. By utilizing such time during which the conveyance is stopped for the right timing, the rear edges 33 of the pair of separators 30 can be joined together in a state where the conveyance by the conveyance unit 200 is stopped within the limits of the specified conveyance tact. Therefore, not only the lateral edges 31 of the pair of separators 30 but also the rear edges 33 of the separators can be joined together without slowing down the speed of packing the electrode 40 between the separators 30.

The second joining units 400 is arranged between the downstream conveyance parts 241 and 242 (between the first conveyor 241 and the second conveyor 242), and the rear edges 33 of the pair of separators 30 are joined together in the middle of the conveyance path of the overlaid electrode 40 and separators 30. With this configuration, the rear edges 33 of the pair of separators 30 in a portion overlapping with the stacking drums 210 and 220 can be joined together without slowing down the speed of packing the electrode 40 between the separators 30.

The pair of separators 30 are conveyed in a state where the lateral edges 31 stick out of the holding surfaces 211 and 221, respectively. With this configuration, the first joining units 300 can be arranged, without interfering with the stacking drums 210 and 220, in an area where the pair of separators 30 are separated from the holding surfaces 211 and 221 of the stacking drums 210 and 220, i.e., on the sides of the nip part 215. The joining operation to sequentially join the lateral edges 31 of the pair of separators 30 together from the front end 51 side in the conveying direction can be performed immediately after the pair of separators 30 are overlaid and separated from the holding surfaces 211 and 221. Thus, the front ends 51 in the conveying direction where the pair of separators 30 are overlaid are joined together immediately after separated from the stacking drums 210 and 220. When the front ends 51 of the pair of separators 30 are joined together, the rear ends of the pair of separators are conveyed while being sandwiched by the stacking drums 210 and 220. Thus, the pair of separators 30 can be joined together while preventing wrinkles or lamination shift in the pair of separators 30. Therefore, so-called separation of the separators 30 can be more effectively prevented.

The pair of separators 30 are conveyed toward the electrode 40 while being held on the respective surfaces of the pair of cylindrical rotors, i.e., stacking drums 210 and 220. With this configuration, since the pair of separators 30 are conveyed while being held on arc surfaces, sequential joining of the lateral edges 31 can be easily performed while conveying the pair of separators 30.

The joining head 301 including the joining chips 302 and 303 to join the pair of separators 30 and the holding unit 304 to hold the workpiece W is moved so as to relatively approach the workpiece W. Then, after the workpiece W is held by the holding unit 304, the pair of separators 30 are joined together by the joining chips 302 and 303. Subsequently, after the joining head 301 is relatively separated from the workpiece W and the joining chips 302 and 303 are separated from the pair of separators 30, clamping of the workpiece W by the holding unit 304 is released.

With this configuration, the holding of the workpiece W by the holding unit 304 and the joining by the joining chips 302 and 303 can be performed by one action of moving the joining head 301 close to the workpiece W within one step. Thus, the cycle time can be reduced. As described above, the cycle time required for packaging the electrode 40 between the pair of separators 30 is reduced, thereby increasing the efficiency of producing the packaged electrode 20, and thus contributing to increased efficiency in producing an entire battery. Moreover, the joining by the joining chips 302 and 303 is performed after the workpiece W is held by the holding unit 304. Thus, the joining can be accurately performed. Furthermore, after the joining, the workpiece W is held by the holding unit 304 until the joining chips 302 and 303 are separated from the workpiece W. This eliminates the risk for the joined separators 30 to be peeled off of each other when the tips of the joining chips 302 and 303 are separated from the junction points 50.

Furthermore, the joining performed while moving the joining units configured to join the lateral edges 31 of the pair of separators 30 together, such that the speed of the first joining units 300 relative to the conveyance speed of the workpiece W approaches zero is repeated multiple times from the front end 51 side in the conveying direction.

Thus, joining is sequentially performed multiple times from the front end 51 side while conveying the separators 30. As a result, the processing time can be reduced while preventing separation of the separators 30. Also, successful joining can be performed without wrinkles generated in the separators 30.

In addition, the joining is performed when the movement speed of the first joining units 300 becomes constant. It is difficult to match the acceleration rates of the separators 30 and the first joining units 300. Thus, timing adjustment for joining and the like are facilitated compared with the case where the joining is performed while accelerating both of the separators 30 and the first joining units 300. As a result, accurate joining can be performed.

(Modification)

Although the description has been given of the configuration in which the rear edges 33 of the separators 30 are joined together by the second joining units 400, the front edges 32 or the both front and rear edges 32 and 33 may be joined together by the second joining units 400.

The pair of stacking drums 210 and 220 arranged one above the other in the above embodiment may be arranged in another direction. The electrode 40 is conveyed along the tangential direction (the direction orthogonal to the straight line connecting the centers of the pair of stacking drums 210 and 220) between the stacking drums 210 and 220. When the stacking drums 210 and 220 are arranged side by side, for example, the electrode 40 may be conveyed in a vertical direction from above or below.

In the above embodiment, the one continuous separator member 34 is cut out by the separator cutters 213 and 223 into a predetermined shape in a state of being attached to the circumferential surfaces of the stacking drums 210 and 220. However, the separators 30 previously cut out into a predetermined shape may be attached to the stacking drums 210 and 220 and conveyed.

INDUSTRIAL APPLICABILITY

As is clear from the above description, the present invention can prevent a pair of separators from being peeled off or getting wrinkled when overlaying the separators on an electrode, thereby increasing the efficiency of producing packaged electrodes.

REFERENCE SIGNS LIST 20 packaged electrode
30 separator
31 lateral edge
32 front edge
33 rear edge
34 front edge
40 electrode
50 junction point
51 front end
100 production device
200 conveyance unit
210, 220 stacking drum, cylindrical rotor
211, 221 holding surface
215 nip part
230 electrode installation unit
241, 242 downstream conveyance part
300 first joining unit
301 joining head
302 first joining chip, upstream joining chip
303 second joining chip, downstream joining chip
304 holding unit
305 clamp spring, biasing member
310 tapered portion
320 heat dissipation means
321 heat dissipation tin
322 space for heat dissipation
323 opening
324 wall member
400 second joining unit
500 controller
W workpiece

The invention claimed is:

1. A device for producing a packaged electrode having an electrode sandwiched between a pair of separators, the device comprising:
   a conveyance unit configured to sequentially overlay the electrode and the pair of separators from a front end side in a conveying direction while conveying the electrode and the pair of separators;
   a first joining chip configured to join lateral edges of the pair of separators together, the lateral edges extending in the conveying direction;
   at least one second joining chip positioned downstream of the first joining chip in the conveying direction and configured to join the lateral edges of the pair of separators together;
   a clamp member movable between a forward position beyond tips of the first joining chip and the at least one second joining chip and a backward position retreated from the forward position in an overlay direction of the electrode and the pair of separators, the clamp member being configured to clamp the pair of separators, wherein the clamp member is separable from the first joining chip and the second joining chip; and
   a controller configured to control operations of the conveyance unit, the first joining chip, the second joining chip, and the clamp member, wherein the controller is configured to drive the first joining chip positioned upstream to join together front ends of the lateral edges of the pair of separators being sequentially overlaid while being conveyed by the conveyance unit, before the front ends are conveyed to the second joining chip positioned downstream, and wherein, upon performing the joining, the controller drives the first joining chip and the clamp member to move the pair of separators together with the first joining chip while clamping the pair of separators with the clamp member.

2. The device for producing a packaged electrode according to claim 1, wherein the controller is configured to drive both the first and second joining chips to sequentially join together the lateral edges of the pair of separators being conveyed by the conveyance unit from the front end side in the conveying direction after completion of joining of the front ends.

3. The device for producing a packaged electrode according to claim 1, wherein the controller is configured to operate only the first joining chip to perform joining of the front ends.

4. The device for producing a packaged electrode according to claim 1, wherein the controller is configured to perform joining of the front ends immediately after overlaying of the pair of separators is started.

5. A device for producing a packaged electrode having an electrode sandwiched between a pair of separators, the device comprising:

conveyance means for sequentially overlaying the electrode and the pair of separators from a front end side in a conveying direction while conveying the electrode and the pair of separators;

first joining chip means for joining lateral edges of the pair of separators together, the lateral edges extending in the conveying direction;

at least one second joining chip means positioned downstream of the first joining chip means in the conveying direction and for joining the lateral edges of the pair of separators together;

a clamping means for clamping the pair of separators, the clamping means being movable between a forward position beyond tips of the first joining chip means and the at least one second joining chip means and a backward position retreated from the forward position in an overlay direction of the electrode and the pair of separators, wherein the clamping means is separable from the first joining chip means and the second joining chip means; and controlling means for controlling operations of the conveyance means, the first joining chip means, the second joining chip means, and the clamping means, wherein the controlling means drives the first joining chip means positioned upstream to join together front ends of the lateral edges of the pair of separators being sequentially overlaid while being conveyed by the conveyance means, before the front ends are conveyed to the second joining chip means positioned downstream, and wherein, upon performing the joining, the controlling means drives the first joining chip means and the clamping means to move the pair of separators together with the first joining chip means while clamping the pair of separators with the clamping means.

6. The device for producing a packaged electrode according to claim 1, wherein the first joining chip comprises a first pressing member and a second pressing member separately arranged from each other in a direction intersecting the conveying direction, the first pressing member and the second pressing member being configured to join the lateral edges of the pair of separators together;

the at least one second joining chip comprises a third pressing member and a fourth pressing member separately arranged from each other in the direction intersecting the conveying direction, the third pressing member and the fourth pressing member being positioned downstream of the first pressing member and the second pressing member in the conveying direction and configured to join the lateral edges of the pair of separators together.

7. The device for producing a packaged electrode according to claim 5, wherein the first joining chip means comprises a first pressing member and a second pressing member separately arranged from each other in a direction intersecting the conveying direction, the first pressing member and the second pressing member being configured to join the lateral edges of the pair of separators together;

the at least one second joining chip means comprises a third pressing member and a fourth pressing member separately arranged from each other in the direction intersecting the conveying direction, the third pressing member and the fourth pressing member being positioned downstream of the first pressing member and the second pressing member in the conveying direction and configured to join the lateral edges of the pair of separators together.

* * * * *